US008365170B2

(12) United States Patent
Hohmann

(10) Patent No.: US 8,365,170 B2
(45) Date of Patent: Jan. 29, 2013

(54) REALIZING JUMPS IN AN EXECUTING PROCESS INSTANCE

(75) Inventor: Dennis Hohmann, Steinenbronn (DE)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 12/270,514

(22) Filed: Nov. 13, 2008

(65) Prior Publication Data

US 2010/0122251 A1 May 13, 2010

(51) Int. Cl.
*G06F 9/455* (2006.01)
*G06F 9/46* (2006.01)

(52) U.S. Cl. ...................................................... 718/100
(58) Field of Classification Search .................. None
See application file for complete search history.

(56) References Cited

U.S. PATENT DOCUMENTS

| | | | | |
|---|---|---|---|---|
| 6,647,508 | B2 * | 11/2003 | Zalewski et al. .................. | 714/3 |
| 2002/0147881 | A1 * | 10/2002 | Pudipeddi et al. ................ | 711/1 |
| 2003/0078957 | A1 * | 4/2003 | Cheeniyil et al. ............. | 709/201 |
| 2006/0259621 | A1 * | 11/2006 | Ranganathan et al. ....... | 709/226 |
| 2008/0196027 | A1 | 8/2008 | Hohmann | |
| 2010/0121668 | A1 * | 5/2010 | Hohmann ......................... | 705/8 |
| 2010/0122251 | A1 * | 5/2010 | Hohmann ..................... | 718/100 |

OTHER PUBLICATIONS

Governatori, Guido, et al, Compliance Checking Between Business Processes and Business Contacts, Proceedings of the 10th Int'l Enterprise Distributed Object Computing Conference (EDOC 2006, pp. 221-232, 2006 IEEE.

* cited by examiner

*Primary Examiner* — Corey S Faherty
(74) *Attorney, Agent, or Firm* — Steven M. Greenberg, Esq.; Carey, Rodriquez, Greenberg & O'Keefe

(57) ABSTRACT

A method for realizing jumps in an executing process instance can be provided. The method can include suspending an executing process instance, determining a current wavefront for the process instance and computing both a positive wavefront difference for a jump target relative to the current wavefront and also a negative wavefront difference for the jump target relative to the current wavefront. The method also can include removing activities from consideration in the process instance and also adding activities for consideration in the process instance both according to the computed positive wavefront difference and the negative wavefront difference, creating missing links for the added activities, and resuming executing of the process instance at the jump target.

9 Claims, 3 Drawing Sheets

REALIZING JUMPS IN AN EXECUTING PROCESS INSTANCE

REFERENCE TO CO-PENDING APPLICATIONS FOR PATENT

The present application is related to the following co-assigned U.S. patent application, which is expressly incorporated by reference herein:

U.S. application Ser. No. 12/024,718 entitled "MIGRATION OF PROCESS INSTANCES", filed on Feb. 1, 2008.

BACKGROUND OF THE INVENTION

1. Field of the Invention

The present invention relates to the field of business process instance execution and more particularly to jump realization in an executing business process instance.

2. Description of the Related Art

The achievement of universal interoperability between applications by using Web standards remains the principal goal of Web Services. Web Services use a loosely coupled integration model to allow flexible integration of heterogeneous systems in a variety of domains including business-to-consumer, business-to-business and enterprise application integration. The following basic specifications originally defined the Web Services space: the Simple Object Access Protocol (SOAP), the Web Services Description Language (WSDL), and Universal Description, Discovery, and Integration (UDDI). SOAP defines an XML messaging protocol for basic service interoperability. WSDL introduces a common grammar for describing services. UDDI provides the infrastructure required to publish and discover services in a systematic way. Together, these specifications allow applications to find each other and interact following a loosely coupled, platform-independent model.

Presently, the interaction model that is directly supported by WSDL essentially can be viewed as a stateless model of synchronous or uncorrelated asynchronous interactions. Models for business interactions typically assume sequences of peer-to-peer message exchanges, both synchronous and asynchronous, within stateful, long-running interactions involving two or more parties. Nevertheless, systems integration requires more than the mere ability to conduct simple interactions by using standard protocols. The full potential of Web Services as an integration platform will be achieved only when applications and business processes are able to integrate their complex interactions by using a standard process integration model.

The Business Process Execution Language (BPEL) for Web Services fulfills some aspects of a standard process integration model. The BPEL for Web Services specification defines a technology for integrating cross-enterprise business processes. By coordinating stateful interactions of loosely coupled services across enterprise boundaries, BPEL technology provides a means of modeling the interactions between an enterprise and its business partners, suppliers and customers and thus the value chain of the enterprise. More particularly, BPEL for Web Services defines a notation for specifying business process behavior based on Web Services.

Workflow management systems provide the vehicle through which business process instances can be created and executed. Further, workflow management systems allow for the end user management of an executing process instance. Nearly all workflow management systems offer the opportunity to change the values of variables of a process instance at runtime. However, changing the values of variables of an executing process instance does not provide enough end user flexibility in managing an executing process instance. Rather, from time to time altering the ordering of activity performance in an executing process instance can be important. The alternation of the ordering of activity performance is referred to as a "jump"—characterized as either a backward jump to a predecessor activity, or a forward jump to a successor activity.

Contemporary workflow management systems realize a backward jump in an executing process instance first by storing the complete state of the executing process instance after each activity has completed. Subsequently, a backward jump can be realized as a restoration of a previous state immediately preceding the target activity. It will be recognized, however, that enormous overhead is required to store all states of an executing process instance, which affects the consumption of physical resources and the performance of the workflow management system. Further, any record of the state of the executing process instance transpiring between the target activity and the activity from which the backward jump occurs will have been lost. Finally, forward jumps, of course, cannot be handled through a restoration of a previously stored state.

BRIEF SUMMARY OF THE INVENTION

Embodiments of the present invention address deficiencies of the art in respect to jump realization in a business process workflow and provide a novel and non-obvious method, system and computer program product for realizing jumps to different activities in an executing process instance implementing a business process workflow. In an embodiment of the invention, a method for realizing jumps in an executing process instance can be provided. The method can include suspending an executing process instance, determining a current wavefront for the process instance and computing both a positive wavefront difference for a jump target relative to the current wavefront and also a negative wavefront difference for the jump target relative to the current wavefront. In this regard, a wavefront for the executing process instance can be the current state of the executing process instance that can include contemporaneously executed activities, activities which have just completed, or activities that are scheduled to execute next, essentially a set of activities navigable in parallel. The method also can include removing activities from consideration in the process instance and also adding activities for consideration in the process instance both according to the computed positive wavefront difference and the negative wavefront difference, creating missing links for the added activities, and resuming executing of the process instance at the jump target.

In another embodiment of the invention, a business process workflow management data processing system can be provided. The system can include a host computing platform having an operating system executing thereon and a workflow management system executing in the host computing platform and managed by the operating system. The system also can include jump realization logic coupled to the workflow management system. The logic can include program code enabled to respond to a directive for a jump to a different activity in an executing process instance by suspending the executing process instance, determining a current wavefront for the process instance, computing both a positive wavefront difference for a jump target relative to the current wavefront and also a negative wavefront difference for the jump target relative to the current wavefront, removing activities from consideration in the process instance and also adding activities for consideration in the process instance both according to the computed positive wavefront difference and the negative wavefront difference, creating missing links for the added activities, and resuming executing of the process instance at the jump target.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for realizing jumps in an executing process instance. In accordance with an embodiment of the present invention, a jump to a target wavefront can be specified in an executing business process instance. The target wavefront can precede a contemporaneous wavefront in the case of a backward jump, or the target wavefront can succeed the contemporaneous wavefront in the case of a forward jump, or the target wavefront can cross the contemporaneous wavefront so as to be both a backward drop and a forward jump. A positive wavefront difference can be computed from the target wavefront and the contemporaneous wavefront, and a negative wavefront difference can be computed from the target wavefront and the contemporaneous wavefront.

Thereafter, the contemporaneous wavefront can be inactivated, for example, by removing queued links for the process instance. Further, the activities of the positive wavefront difference can be removed from consideration in the execution of the process instance, for example by deleting the activities from a database of activities to be activated in the course of executing the process instance. Yet further, the activities of the negative wavefront difference can be added for consideration in the execution of the process instance. Finally, the target wavefront can be activated, for example, by queuing new links to the added activities and navigation can be directed from the target wavefront.

Figure 1:
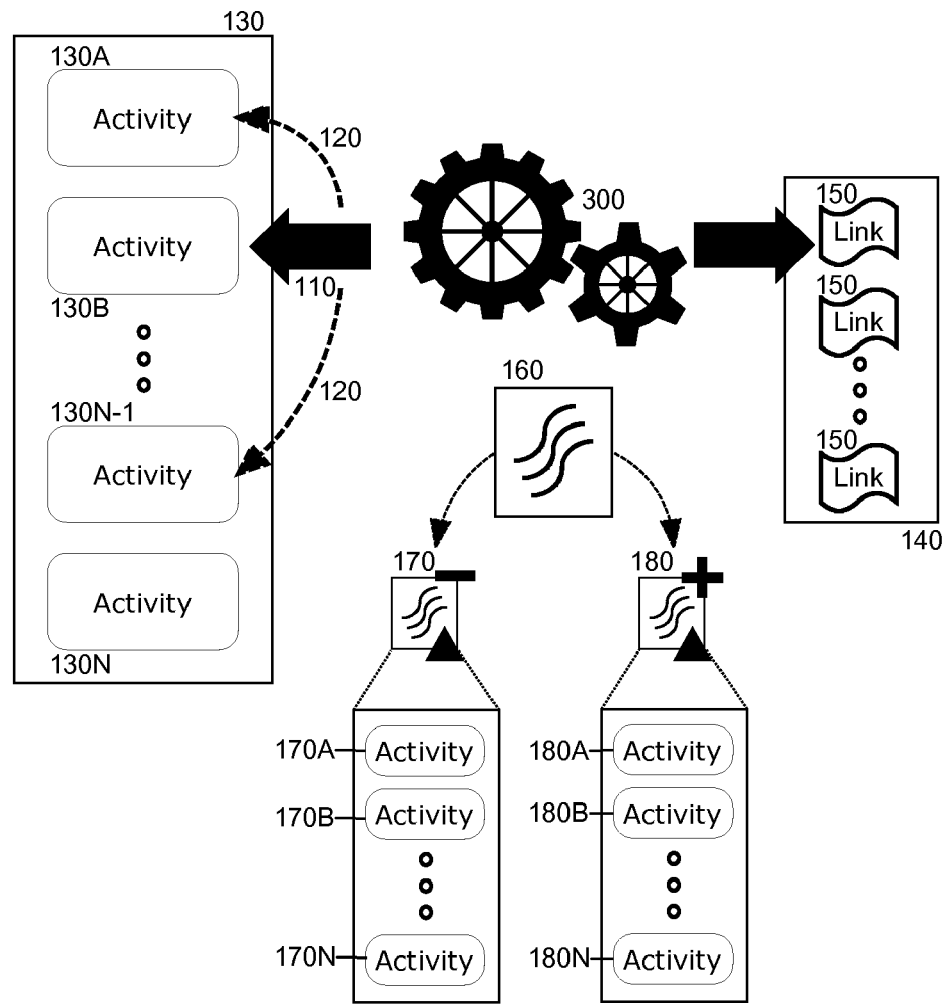
FIG. 1 is a pictorial illustration of a process for realizing jumps in an executing process instance.

In further illustration, FIG. 1 pictorially depicts a process for realizing jumps in an executing process instance. As shown in FIG. 1, a process instance 130 can include multiple different activities 130A, 130B, 130N, 130N-1 which in the aggregate define a workflow. Links 150 to the different activities 130A, 130B, 130N, 130N-1 can be placed in a queue 140 in order to define an order of execution of each of the activities 130A, 130B, 130N, 130N-1 recognizing that one or more activities 130A, 130B, 130N, 130N-1 can be executed contemporaneously (e.g. in parallel). Contemporaneously scheduled ones 110 of the activities 130A, 130B, 130N, 130N-1 is known as a wavefront 160.

Jump realization logic 300 can receive a directive to jump to an existing one of the activities 130A, 130B, 130N, 130N-1 by way of a specified jump target 120. In this regard, the jump target 120 can succeed or precede the contemporaneously scheduled ones 110 of the activities 130A, 130B, 130N, 130N-1 resulting in either a forward jump or a backward jump, or a hybrid forward-backward jump, respectively. In response to a directive to jump to the specified jump target 120, the execution of the contemporaneously scheduled ones 110 of the activities 130A, 130B, 130N, 130N-1 can be suspended and both a negative wavefront difference 170 and also a positive wavefront difference 180 can be computed. The positive wavefront difference 170 can include those activities 170A, 170B, 170N that precede the wavefront 160 and are in common with those activities that succeed the jump target 120. In contrast, the negative wavefront difference 180 can include those activities 180A, 180B, 180N that succeed the wavefront 160 and are in common with those activities that precede the jump target 120.

Consequently, to realize a jump, the activities 170A, 170B, 170N in the positive wavefront difference 170 can be removed from consideration in the process instance 130 while the activities 180A, 180B, 180N of the negative wavefront difference 180 can be added for consideration in the process instance 130. Thereafter, missing ones of the links 150 to the newly added ones of the activities 130A, 130B, 130N, 130N-1 can be created and placed in the queue 140. Finally, the execution of the process instance at the jump target 120 can resume.

Figure 2:
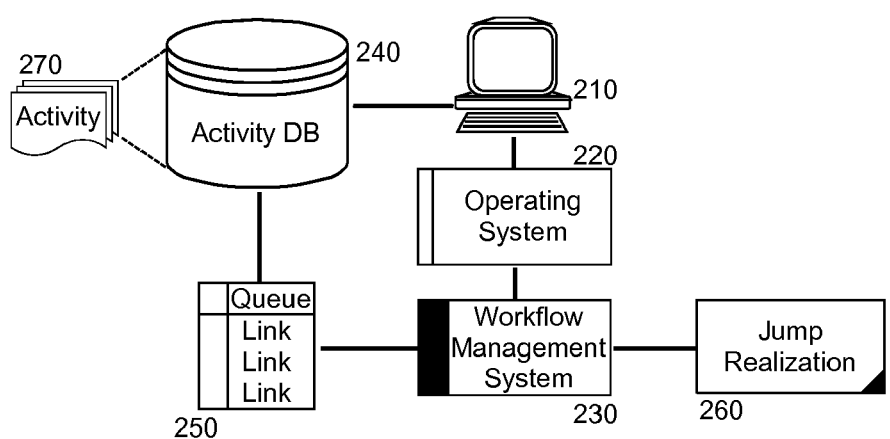
FIG. 2 is a schematic illustration of a business process workflow management data processing system configured for realizing jumps in an executing process instance.

The process described in connection with FIG. 1 can be implemented within a business process workflow management data processing system. In further illustration, FIG. 2 schematically depicts a business process workflow management data processing system configured for realizing jumps in an executing process instance. The system can include a host computing platform 210 executing an operating system 220. The operating system 220 in turn can support the operation of a workflow management system 230, for example a BPEL process editing tool storing defined processes and executing process instances of multiple different activities 270 stored activity database 240. Links between the different activities 270 for an executing process instance can be placed in a queue 250 ordered for execution in accordance with a workflow defined by a specified arrangement of the activities of the executing process instance set forth by the links.

Notably, jump realization logic 260 can be coupled to the workflow management system 230. The jump realization logic 260 can include program code enabled to process a jump directive to jump to a jump target amongst the activities 270. The program code further can be enabled to respond to the jump directive by suspending the execution of the process instance and by determining each of a wavefront for the executing process instance, a positive wavefront difference and a negative wavefront difference relative to the jump target. The program code yet further can be enabled to remove selected ones of the activities 270 from the activity database 240 and to add new ones of the activities 270 to the activity database 240 based upon the activities present in the computed positive wavefront difference and the negative wavefront difference. Finally, the program code can be enabled to create missing links for the newly added ones of the activities 270, to place the missing links in the queue 250 and to resume execution of the process instance at the jump target.

Figure 3:
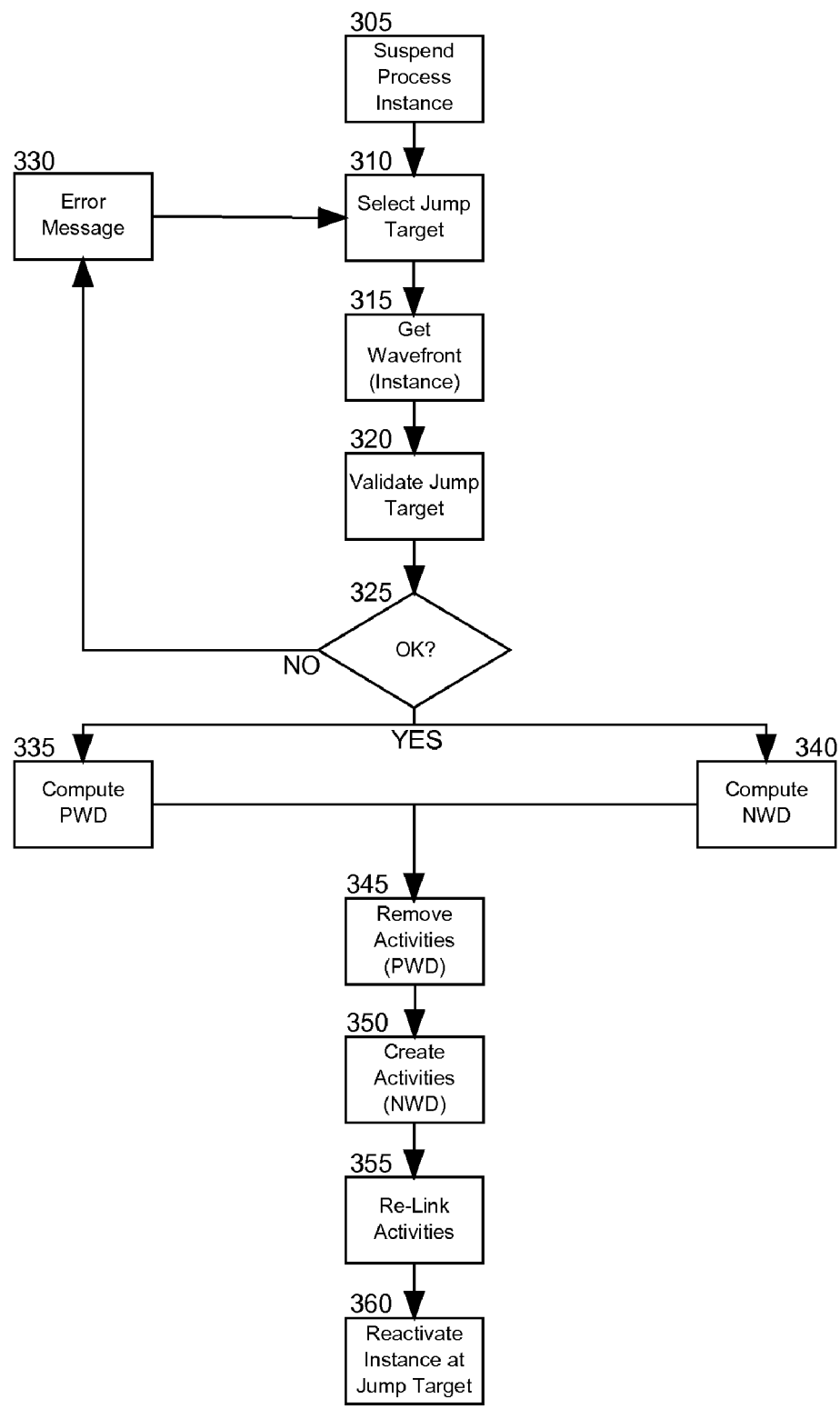
FIG. 3 is a flow chart illustrating a process for realizing jumps in an executing process instance; and, FIG. 4 is a flow chart illustrating a process for migrating new instances of a business process through jump realization.

In yet further illustration of the operation of the jump realization logic 260, FIG. 3 is a flow chart illustrating a process for realizing jumps in an executing process instance. Beginning in block 305, in response to a jump directive, the executing process instance implicated by the jump directive can be suspended and in block 310, a jump target—namely one or more activities in the executing process instance—can be selected. In block 315, a current wavefont can be determined for the now suspended executing process instance and in block 320, the selected jump target can be validated. In particular, the selected jump target will be deemed a valid proposed wavefront, when the activities directly preceding the proposed wavefront do not include any of the activities directly succeeding the proposed wavefront. In decision block 325, if the selected jump target is determined not to be valid, in block 330 an error message can be provided and the process can return to block 310. Otherwise, the process can proceed to blocks 335 and 340.

In block 335 a positive wavefront difference can be computed for the jump target. For example, the positive wavefront difference can be computed as PWD(Current Wavefront,Wavefront(Jump Target)):
=Future(Wavefront(Jump Target))intersection
Past(Current Wavefront)

Likewise, in block 340, a negative wavefront difference can be computed for the jump target. For example, the negative wavefront difference can be computed as NWD(Current Wavefront,Wavefront(Jump Target)):
=Future(Current Wavefront)intersection Past
(Wavefront(Jump Target))

In block 345 the activities of the positive wavefront difference can be removed from the database, or otherwise flagged "jumped" or "inactive". Alternatively, the effect of each activity to be removed can be rolled back or otherwise ameliorated. Subsequently, in block 350, the activities of the negative wavefront difference can be created and added to the database. In block 355 links between the added activities can be recreated where not already existing. For example, for links defined in the template for the executing process instance, if the source activity of a link is an element of the past activities of the wavefront for the jump target, and if the jump target is an element of the future activities of the wavefront for the jump target, the a missing link will have been identified and will be created. Finally, in block 360 the process instance can be reactivated at the jump target.

The ability to perform forward and backward jumps on a running process instance enables end users to migrate from one version of a workflow management system to another without disrupting already running process instances. In this regard, where running process instances can literally run for months on end, migrating to a new workflow management system can be delayed, as such. Rather than compelling the end user to abort running process instances to perform a migration to a new workflow management system, jump realization can be utilized to smoothly migrate from one workflow management system to another.

Specifically, the new workflow management system can be launched in parallel with the existing workflow management system. Thereafter, the process instance can be copied into the new workflow management system and a jump can be realized to a wavefront in the process instance in the new workflow management system consistent with a contemporaneous wavefront in the existing workflow management system. The variable values for the process instance in the new workflow management system can be copied from the variable values of the existing workflow management system and the new workflow management system can be activated while the existing workflow management system can be terminated.

Figure 4:
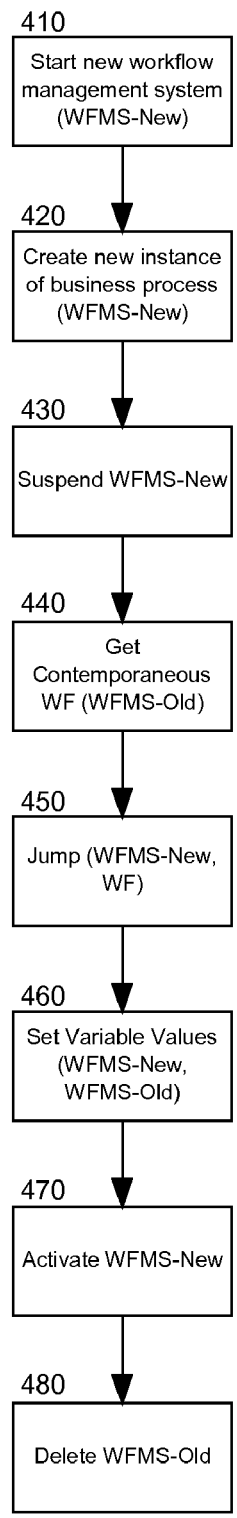

In more particular illustration, FIG. 4 is a flow chart illustrating a process for migrating new instances of a business process through jump realization. Beginning in block 410, a new workflow management system can be started to run in parallel with an existing workflow management system managing the execution of an already running instance of a business process. In block 420, a new instance of the business process can be created in the new workflow management system to mirror the already running instance of the business process in the existing workflow management system. In block 430, the new workflow management system can be suspended and in block 440, a contemporaneous wavefront can be determined for the already running process instance in the existing workflow management system.

In block 450, a jump to the contemporaneous wavefront can be realized in the new instance of the business process in the new workflow management system. Also, in block 460, the variable values for the new instance of the business process can be set to match those of the already running process instance in the existing workflow management system. Subsequently, in block 470 the new workflow management system can be activated so as to allow the new instance of the process instance to supplant the already running instance of the business process. Finally, in block 480 the existing workflow management system can be terminated thus completing the migration process from one workflow management system to another.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be appreciated that various changes may be made to the described embodiments without departing from the principles and spirit of the invention, the scope of which is defined by the appended claims.

I claim:

1. A method for realizing jumps in an executing process instance, the method comprising:
   suspending an executing process instance;
   determining a current wavefront for the process instance;
   computing both a positive wavefront difference for a jump target relative to the current wavefront and also a negative wavefront difference for the jump target relative to the current wavefront;
   removing activities from consideration in the process instance and also adding activities for consideration in the process instance both according to the computed positive wavefront difference and the negative wavefront difference;
   creating missing links for the added activities; and,
   resuming executing of the process instance at the jump target.

2. The method of claim 1, further comprising validating a proposed wavefront for the jump target prior to performing the computing, removing, creating and resuming steps.

3. The method of claim 1, wherein computing a positive wavefront difference comprises computing an intersection of future activities for a proposed wavefront for the jump target, with past activities of the current wavefront.

4. The method of claim 1, wherein computing a negative wavefront difference comprises computing an intersection of past activities for a proposed wavefront for the jump target, with future activities of the current wavefront.

5. A business process workflow management data processing system comprising:
   a host computing platform having an operating system executing thereon;
   a workflow management system executing in the host computing platform and managed by the operating system; and,
   jump realization logic coupled to the workflow management system, the logic comprising program code enabled to respond to a directive for a jump to a different activity in an executing process instance by suspending the executing process instance, determining a current wavefront for the process instance, computing both a positive wavefront difference for a jump target relative to the current wavefront and also a negative wavefront difference for the jump target relative to the current wavefront, removing activities from consideration in the process instance and also adding activities for consideration in the process instance both according to the computed positive wavefront difference and the negative wavefront difference, creating missing links for the added activities, and resuming executing of the process instance at the jump target.

6. A computer program product comprising a computer usable storage medium storing computer usable program code for jump realization in an executing process instance, the computer program product comprising:
   computer usable program code for suspending an executing process instance;
   computer usable program code for determining a current wavefront for the process instance;
   computer usable program code for computing both a positive wavefront difference for a jump target relative to the current wavefront and also a negative wavefront difference for the jump target relative to the current wavefront;
   computer usable program code for removing activities from consideration in the process instance and also adding activities for consideration in the process instance both according to the computed positive wavefront difference and the negative wavefront difference;
   computer usable program code for creating missing links for the added activities; and,
   computer usable program code for resuming executing of the process instance at the jump target.

7. The computer program product of claim 6, further comprising computer usable program code for validating a proposed wavefront for the jump target prior to performing the computing, removing, creating and resuming steps.

8. The computer program product of claim 6, wherein the computer usable program code for computing a positive wavefront difference comprises computer usable program code for computing an intersection of future activities for a proposed wavefront for the jump target, with past activities of the current wavefront.

9. The computer program product of claim 6, wherein the computer usable program code for computing a negative wavefront difference comprises computer usable program code for computing an intersection of past activities for a proposed wavefront for the jump target, with future activities of the current wavefront.

* * * * *